United States Patent
Nania

(10) Patent No.: US 9,956,924 B2
(45) Date of Patent: May 1, 2018

(54) TRI-FOLD TAILGATE WORK SURFACE

(71) Applicant: Ford Global Technologies, LLC, Dearborn, MI (US)

(72) Inventor: Adrian Nania, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/233,320

(22) Filed: Aug. 10, 2016

(65) Prior Publication Data
US 2018/0043842 A1 Feb. 15, 2018

(51) Int. Cl.
*B62D 33/027* (2006.01)
*B60R 11/06* (2006.01)
*B60R 11/00* (2006.01)

(52) U.S. Cl.
CPC .......... *B60R 11/06* (2013.01); *B62D 33/0273* (2013.01); *B60R 2011/004* (2013.01)

(58) Field of Classification Search
CPC .............. B60R 11/06; B60R 2011/004; B62D 33/0273
USPC ........................ 296/57.1, 37.5, 51, 1.07, 152
See application file for complete search history.

(56) References Cited

U.S. PATENT DOCUMENTS

| | | | | |
|---|---|---|---|---|
| 5,823,595 A | * | 10/1998 | Tronco | B60P 3/14 296/26.03 |
| 6,193,294 B1 | * | 2/2001 | Disner | B62D 33/0273 108/44 |
| 6,364,391 B1 | * | 4/2002 | Everett | B60N 2/24 296/51 |
| 7,354,090 B1 | * | 4/2008 | Pomorski | B60N 2/005 296/26.11 |
| 7,628,439 B1 | * | 12/2009 | Strong | B62D 33/0273 108/44 |
| 8,182,012 B1 | * | 5/2012 | Brister | B60P 3/40 296/26.11 |
| 8,240,527 B1 | * | 8/2012 | Casselton | B60R 9/065 224/281 |
| 9,387,806 B2 | * | 7/2016 | Bzoza | B60R 5/041 |
| 9,481,316 B2 | * | 11/2016 | Faruque | B60R 9/06 |
| 2014/0305977 A1 | * | 10/2014 | Sparks | B60P 1/6427 224/404 |
| 2015/0047536 A1 | | 2/2015 | Parks et al. | |

* cited by examiner

*Primary Examiner* — Jason S Morrow
*Assistant Examiner* — E Turner Hicks
(74) *Attorney, Agent, or Firm* — Jason Rogers; Brooks Kushman P.C.

(57) ABSTRACT

A work table is provided for a pickup truck tailgate. The work table is received in a pocket defined in a rear portion of the truck bed and is deployed to overlie an inner surface of the tailgate. Guide members and followers provided on a pivot connector guide the work table as it is lowered into and raised from the pocket. Right and left panels are provided on either side of the main panel to cover right and left portions of the tailgate. The pocket is disposed between the spare tire and bumper and between the right and left frame rails at the rear sill of the truck bed.

15 Claims, 5 Drawing Sheets

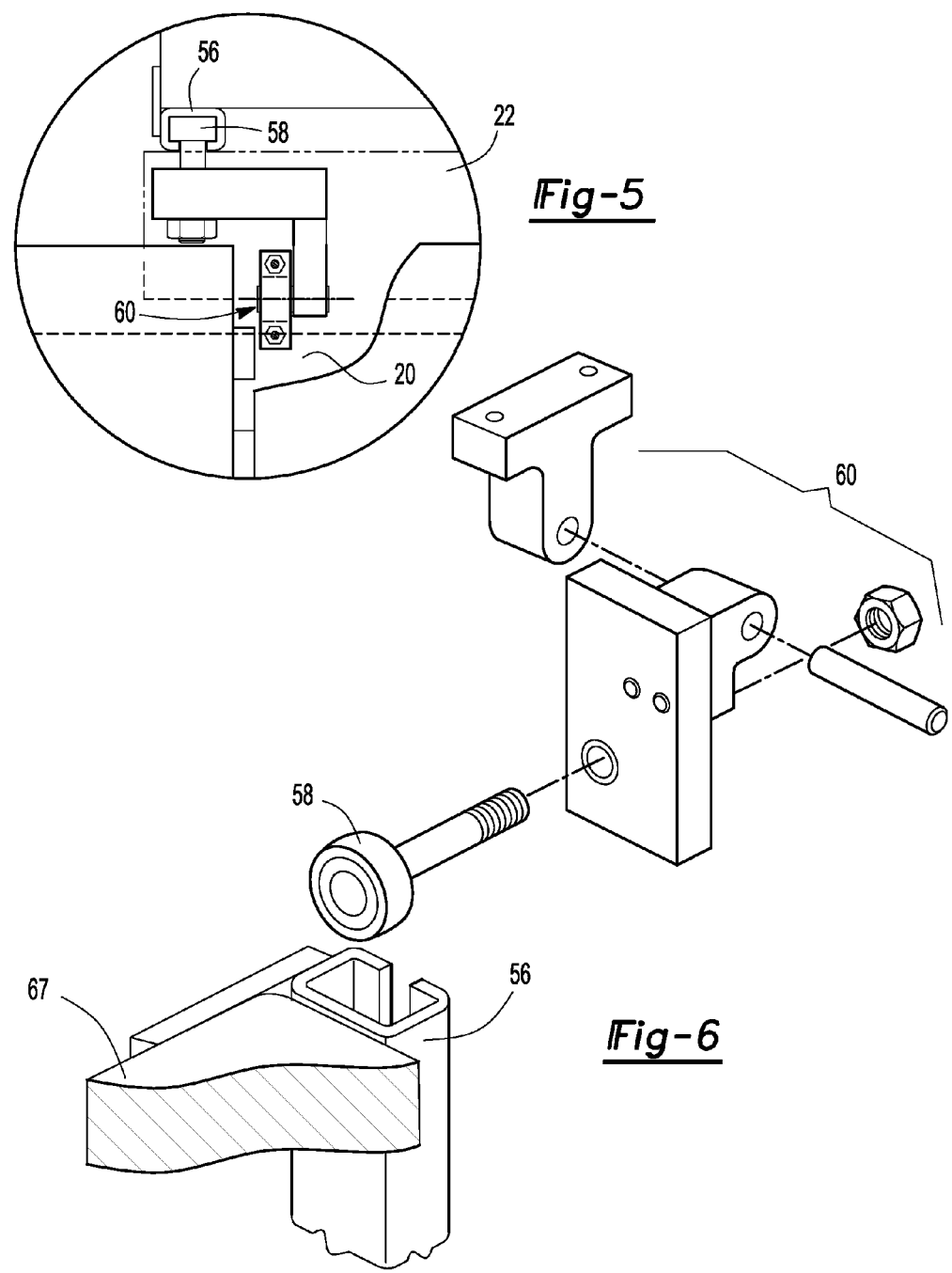

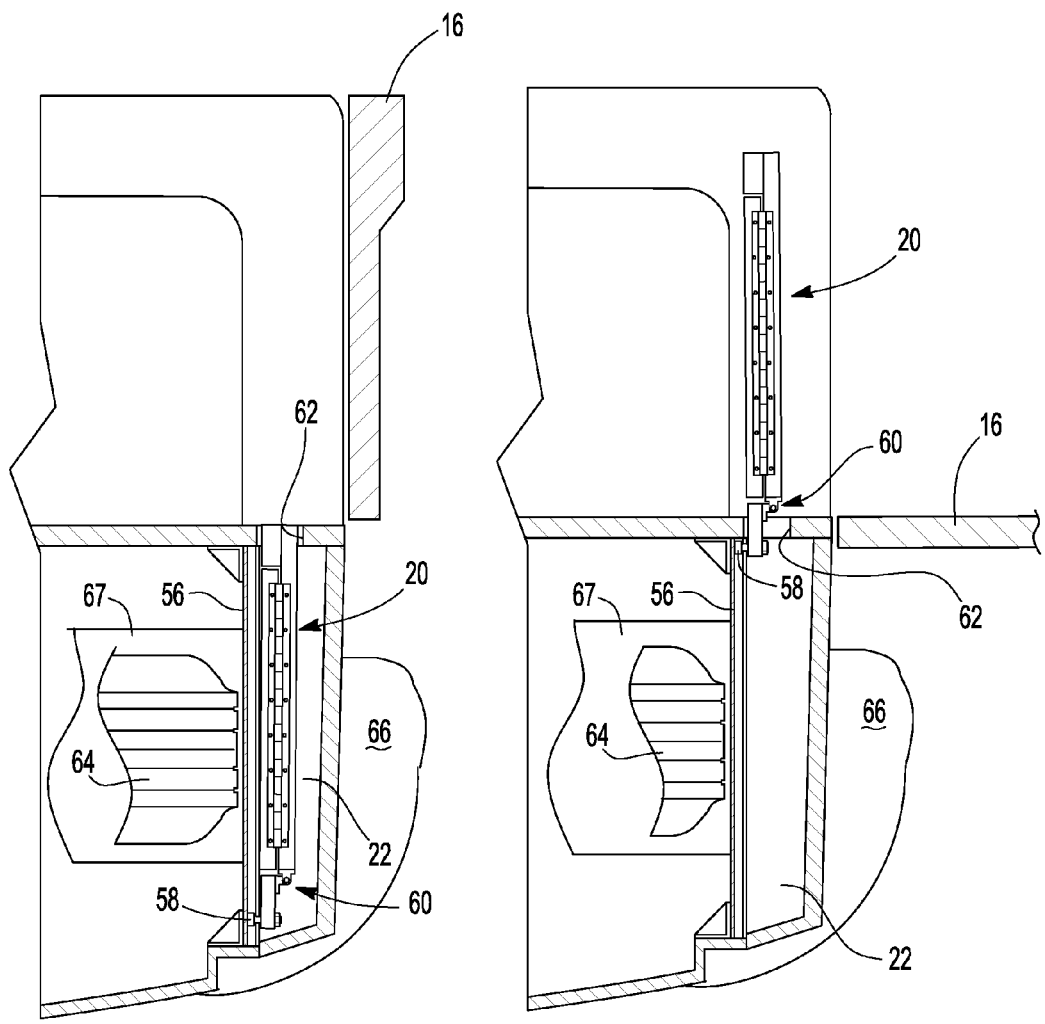

TRI-FOLD TAILGATE WORK SURFACE

TECHNICAL FIELD

This disclosure relates to a work surface supported on a tailgate that is stowed in a rear portion of a truck bed.

BACKGROUND

A flat work surface is needed for writing on plans at a work site. A table or saw horses and board may be set up at a work site to write on drawings but the table or saw horses and board are inconvenient and require valuable cargo space when transported to a work site.

Truck tailgates are of an appropriate height and offer good stability but do not provide flat surfaces to write on due to the reinforcing ribs on the inner surface of the tailgate. A board may be placed on a tailgate to provide a writing surface but it is difficult to secure a board to a tailgate without damaging the tailgate.

This disclosure is directed to solving the above problems and other problems as summarized below.

SUMMARY

According to one aspect of this disclosure, a work table is provided for a pickup truck tailgate. The work table includes a main panel including a pair of followers with pivot connectors on opposite lateral sides of the main panel. A truck bed has a rear portion that defines a pocket and a pair of guide members are provided on opposite lateral sides of the pocket. The followers are received by the guides in the pocket. The main panel is extended from the pocket and pivoted on the pivot connectors to overlie a tailgate in an open position.

According to another aspect of this disclosure, a truck bed is provided that includes a floor having a rear portion defining a pocket. A tailgate pivots between an open position and a closed position. A main panel is movable between a storage position in the pocket to a work table position on the tailgate when the tailgate is in the open position.

According to other aspects of this disclosure, the work table may include a right panel connected by first hinge to a right edge of the main panel. A left panel may be connected by a second hinge to a left edge of the main panel so that the right panel and a left panel are pivoted on the first and second hinges when the main panel overlies the tailgate to provide an extended work table on the tailgate.

Alternatively, the work table apparatus may include right and left panels received in first and second receptacles to be extended from opposite edges of the main panel. The right and left panels shift in and out of first and second receptacles to provide an extended work table on the tailgate.

A top/rear bar may be attached to a distal edge of the main panel that is disposed at the top of the main panel when stowed in the pocket and is disposed rearward of the main panel when the main panel overlies the tailgate.

The top/rear bar may include a grip for facilitating lifting the main panel out of the pocket.

The top/rear bar may include scale markings for measuring objects.

A strip may be attached to the work table adjacent the main panel and top/rear bar by a pivot connector to measure angles on a drawing or a work piece.

The pocket may be defined laterally between a pair of frame rails and longitudinally in back of a spare tire and in front of a bumper.

The above aspects of this disclosure and other aspects will be described below with reference to the attached drawings.

BRIEF DESCRIPTION OF THE DRAWINGS

FIG. 5 is an enlarged top plan view taken inside the circle 5 in FIG. 4.

FIG. 6 is a fragmentary, exploded perspective view of the pivot connector shown in FIGS. 4 and 5.

FIG. 7 is a fragmentary, cross-sectional view taken along the line 7-7 in FIG. 1 of the work table disposed in the pocket.

FIG. 8 is a fragmentary, cross-sectional view taken along the line 7-7 in FIG. 1 showing the work table being lifted out of the pocket.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
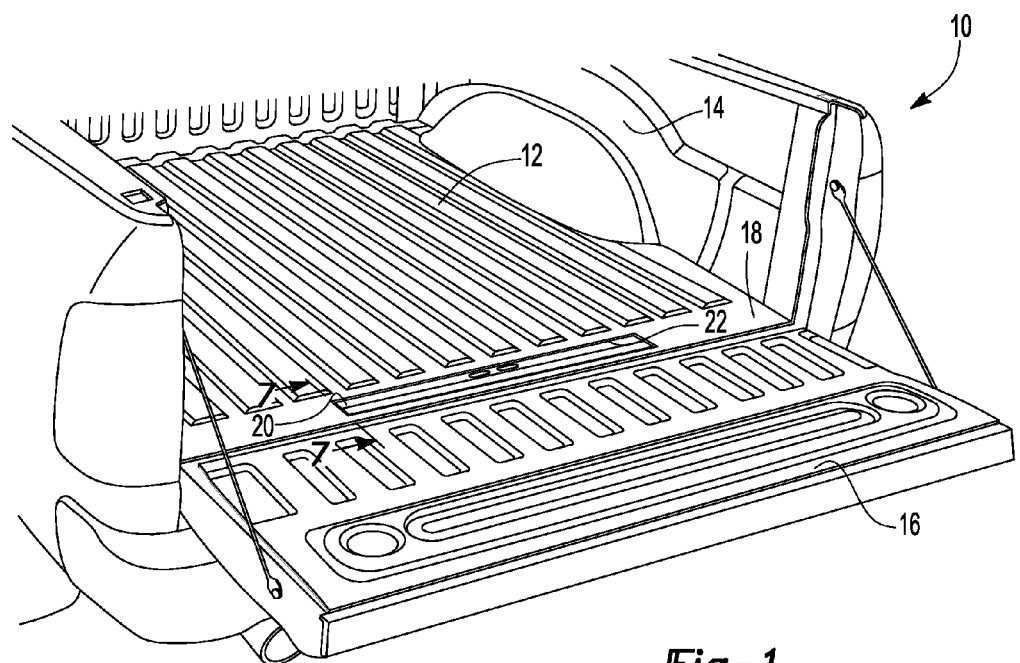
FIG. 1 is a fragmentary, perspective view of a pickup truck having a truck bed and tailgate with a work table stored in a pocket in a rear portion of the truck bed.

Referring to FIG. 1, a pickup truck 10 is illustrated that includes a truck bed 12 that is flanked by sidewalls 14. A tailgate 16 is shown in an open position to provide access to the truck bed 12. A rear sill 18 of the truck bed 12 is located at the rear portion of the truck bed 12. A work table 20 is shown received in a pocket 22 defined by the truck bed 12 in the rear sill 18.

Figure 2:
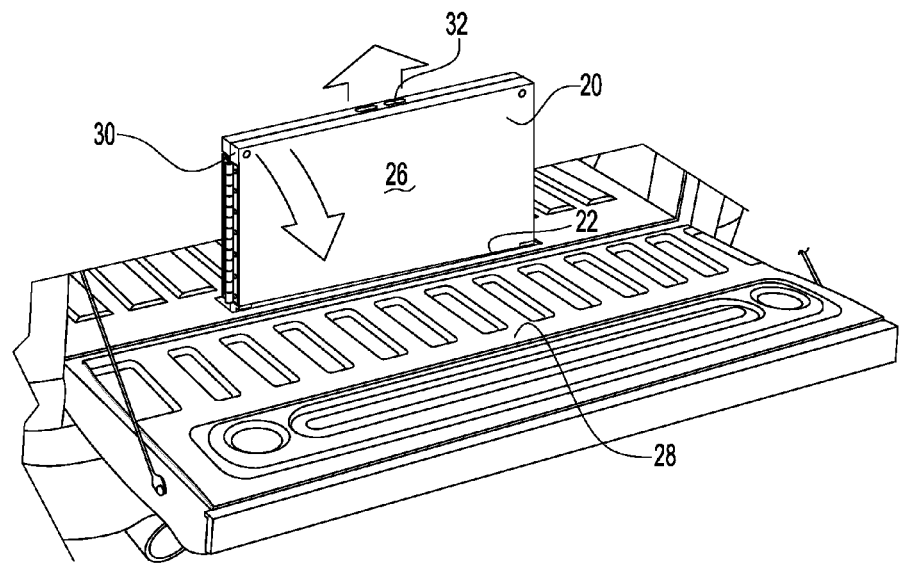
FIG. 2 is a fragmentary, perspective view of the pickup truck shown in FIG. 1 with the work table being lifted from the pocket.

Referring to FIG. 2, the work table 20 is shown lifted after being lifted from the pocket 22. A main panel 26 of the work table 20 is in a position to be pivoted on to the inner surface 28 of the tailgate 16. A top/rear bar 30 is provided on the main panel 26. The top/rear bar 30 may include a grip 32 or, alternatively, may define recesses that provide a gripping area on the top/rear bar 30.

Figure 3:
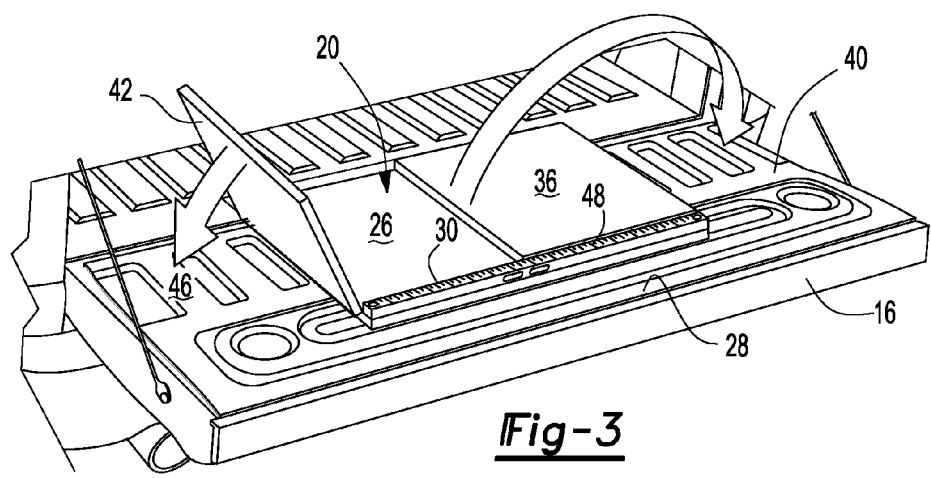
FIG. 3 is a fragmentary, perspective view of the pickup truck shown in FIG. 1 with a main panel of the work table overlying an inner surface of the tailgate with a left panel being pivoted to its deployed position.

Referring to FIG. 3, the tailgate 16 is shown with the work table 20. The main panel 26 is shown overlying the tailgate 16. A right panel 36 is shown lying on the main panel 26 with an arrow showing the intended pivoting motion for the right panel 36.

Figure 4:
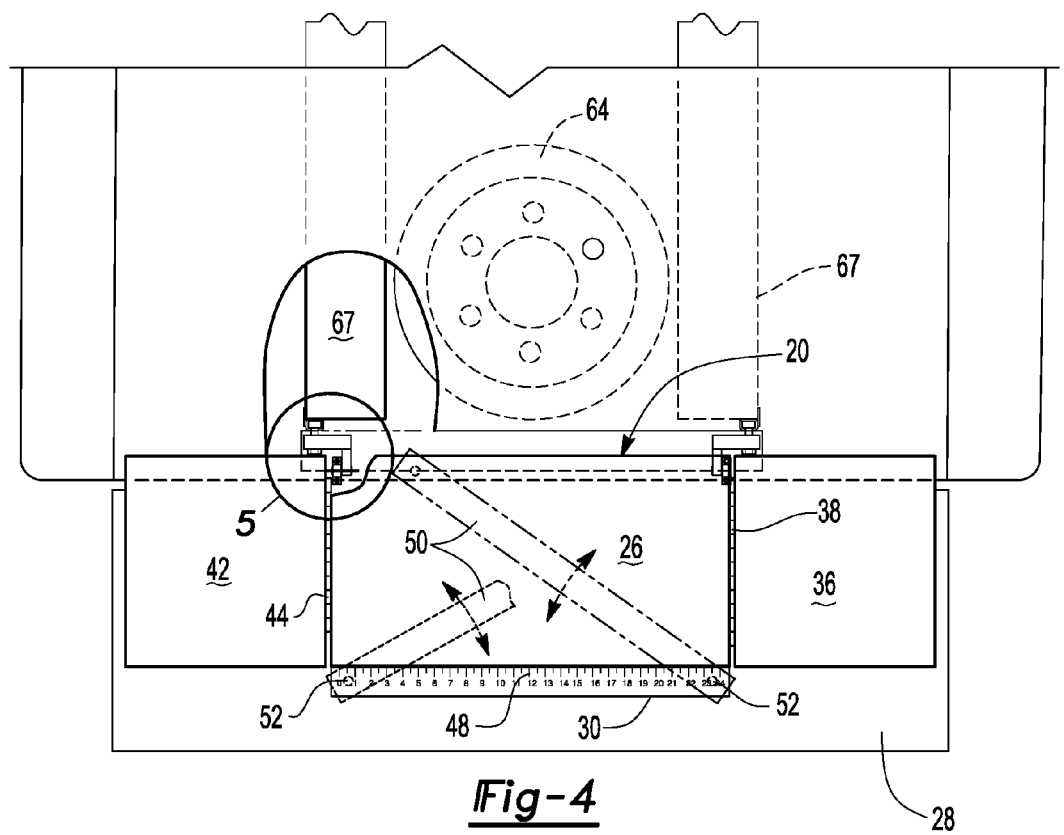
FIG. 4 is a fragmentary, top plan view of the work table opened onto the open tailgate.

Referring to FIGS. 3 and 4, the right panel 36 is connected by a first hinge 38 to the main panel 26. The right panel 36 is pivoted about the first hinge 38 to overly a right side portion 40 of the tailgate 16. A left panel 42 is connected by a second hinge 44 or to a left side portion 46 of the tailgate 16. In FIG. 3, the left panel 42 is shown partially pivoted toward the left side portion 46. Referring to FIG. 4, the tailgate 16 is shown with the work table 20 fully deployed with the main panel 26, right panel 36 and left panel 42 lying on the inner surface 28 of the tailgate 16.

The top/rear bar 30 of the work table 20 includes scale markings 48 for measuring objects or areas of drawings placed on the work table 20. Referring to FIG. 4, a pair of strips 50 comprising a rigid strip of metal, plastic, or the like are connected by pivot connectors 52 to the top/rear bar 30. In FIG. 4, two strips 50 are shown that may be positioned at a range of angular orientations relative to the top/rear bar 30 to measure angles on objects or drawings disposed on the work table 20.

Referring to FIGS. 5 and 6, the work table 20 is connected to guides 56 that receive followers 58, such as rollers, for guiding the work table 20 into and out of the pocket 22. A pivot connector 60 is attached to the follower 58 and the work table 20. The work table 20 pivots onto the tailgate 16 after being lifted from the pocket 22 as will be described below.

Figure 9:
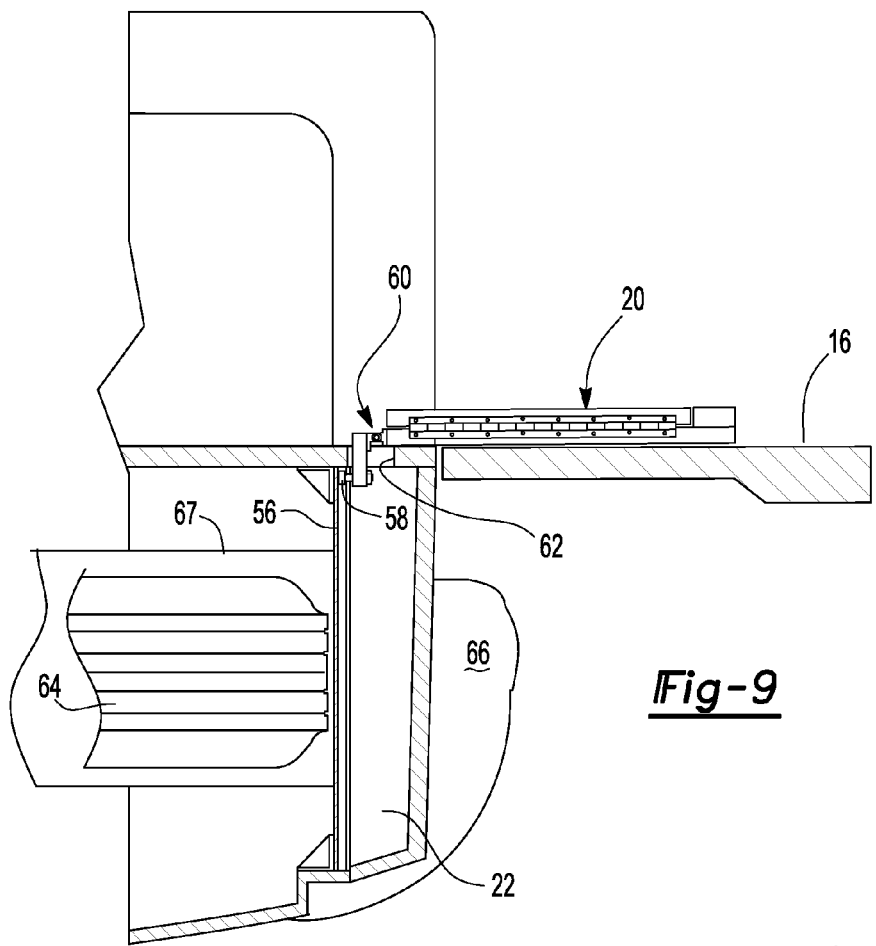
FIG. 9 is a cross-sectional view taken along the line 7-7 in FIG. 1 showing the work table overlying the tailgate with the right and left side panels retracted.

Referring to FIG. 7-9, the work table 20 is shown disposed in the pocket 22 in FIG. 5. In FIG. 6, the work table is shown being lifted from the pocket 22. In FIG. 7, the work table 20 is shown as it is pivoted onto the tailgate 16. The pocket 22 defines guides 56, or receives a guide track, that is adapted to receive followers 58 that follow the guides 56 as the work table 20 is raised and lowered relative to the pocket 22. The followers 58 are rollers or roller bearings that are attached to pivot connectors 60. The pivot connectors 60 are connected to the followers 58 and allow the work table 20 to be pivoted onto the tailgate 16 after the work table 20 is fully lifted from the pocket 22. The truck bed 12 defines an opening 62 through which the work table 20 is lifted and lowered relative to the pocket 22. A spare tire 64 is shown in its storage orientation below the rear area of the truck bed 12. A bumper 66 is shown rearward of the pocket 22. The pocket 22 and work table 20 are longitudinally disposed between the spare tire 64 and the bumper 66.

As shown in FIG. 4, the pocket 22 and work table 20 are laterally disposed between the frame rails 67. The spare tire 64 is also disposed between the frame rails 67.

Figure 10:
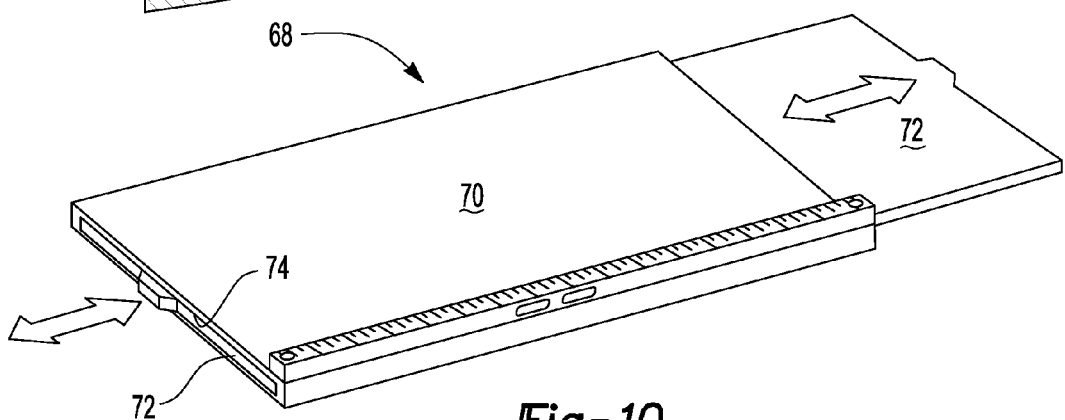
FIG. 10 is a perspective view of an alternative embodiment of a work table including a main panel and right and left slide panels received in receptacles provided in the main panel.

Referring to FIG. 10, an alternative embodiment of a work table 60 is generally referred to by reference numeral 68. The work table 68 includes a main panel 70. The work table 68 shown in FIG. 10 may be substituted for the work table 20 shown in FIGS. 1-7. The work table is received in the pocket 22 and also includes guides, followers and a pivot connector as previously described with respect to FIGS. 1-7.

In the embodiment of FIG. 10, slide panels 72 are received in receptacles 74 on right and left sides of the main panel 70. The slide panel 72 is shown as it is extended from the receptacle (not shown) on the right side of the main panel 70. On the left side of FIG. 10, another slide panel 72 is shown fully received in the receptacle 74 defined by the main panel 70.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A work table and truck bed comprising:
   a main panel;
   a rear portion of the truck bed defining a pocket, a pair of guides on opposite lateral sides of the pocket; and
   a pair of followers including pivot connectors on opposite lateral sides of the main panel received by the guides, wherein the main panel is vertically extended from the pocket and pivoted on the pivot connectors to overlie a tailgate in an open position.

2. The work table and truck bed of claim 1 further comprising:
   a right panel connected by a first hinge to a right edge of the main panel; and
   a left panel connected by a second hinge to a left edge of the main panel, wherein the right panel and the left panel are pivoted on the first and second hinges when the main panel overlies the tailgate to provide an extended work table on the tailgate.

3. The work table and truck bed of claim 1 further comprising:
   a right panel received in a first receptacle to be extended from a right edge of the main panel; and
   a left panel received in a second receptacle to be extended from a left edge of the main panel, wherein the right panel and the left panel are extended and retracted from the first and second receptacles when the main panel overlies the tailgate to provide an extended work table on the tailgate.

4. The work table and truck bed of claim 1 further comprising:
   a top/rear bar attached to a distal edge of the main panel, wherein the top/rear bar is disposed at the top of the main panel when stowed in the pocket and is disposed rearward of the main panel when main panel overlies the tailgate.

5. The work table and truck bed of claim 4 wherein the top/rear bar includes a grip for facilitating lifting the main panel out of the pocket.

6. The work table and truck bed of claim 4 wherein the top/rear bar includes scale markings for measuring objects.

7. The work table and truck bed of claim 4 further comprising:
   a strip attached to the work table apparatus adjacent the main panel and the top/rear bar by a pivot connector to measure angles on a drawing or a work piece.

8. A truck bed comprising:
   a floor having a rear portion defining a pocket;
   a tailgate pivoted between an open position and a closed position; and
   a main panel movable between a storage position in the pocket in a vertical direction to a position above the truck bed and is then pivoted to a work table position above the tailgate when the tailgate is in the open position.

9. The truck bed of claim 8 further comprising:
   a right panel connected to a right edge of the main panel; and
   a left panel connected to a left edge of the main panel, wherein the right panel and the left panel are moved from a retracted position when the main panel is in the pocket to an extended position overlying portions of the tailgate not covered by the main panel in the work table position to provide an extended work table on the tailgate.

10. The truck bed of claim 8 wherein the pocket is defined laterally between a pair of frame rails and a pair of bumper mounts.

11. The truck bed of claim 8 wherein the pocket is defined longitudinally in back of a spare tire and in front of a bumper, wherein the pocket extends in the vertical direction and in a transverse vehicle direction, and wherein the pocket extends in a longitudinal vehicle direction less than the vertical direction.

12. The truck bed of claim 8 further comprising:
   a top/rear bar attached to a distal edge of the main panel, wherein the top/rear bar is disposed at the top of the main panel when stowed in the pocket and is disposed rearward of the main panel when main panel is in the open position.

13. The truck bed of claim 12 wherein the top/rear bar includes a grip for facilitating lifting the main panel out of the pocket.

14. The truck bed of claim 12 wherein the top/rear bar includes scale markings for measuring objects.

15. The truck bed of claim 12 further comprising:
   a strip attached to the main panel and the top/rear bar by a pivot connector to measure angles on a drawing or a work piece.

* * * * *